(12) United States Patent
Pursifull et al.

(10) Patent No.: US 10,947,923 B2
(45) Date of Patent: Mar. 16, 2021

(54) METHOD AND SYSTEM FOR DETERMINING FUEL INJECTOR VARIABILITY

(71) Applicant: Ford Global Technologies, LLC, Dearborn, MI (US)

(72) Inventors: Ross Pursifull, Dearborn, MI (US); Joseph Lyle Thomas, Holt, MI (US); Michael Uhrich, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 16/250,755

(22) Filed: Jan. 17, 2019

(65) Prior Publication Data
US 2020/0232411 A1 Jul. 23, 2020

(51) Int. Cl.
| F02B 17/00 | (2006.01) |
| F02D 41/40 | (2006.01) |
| F02M 63/02 | (2006.01) |
| F02M 65/00 | (2006.01) |
| F02D 41/24 | (2006.01) |
| F02D 41/04 | (2006.01) |

(52) U.S. Cl.
CPC ........... *F02D 41/403* (2013.01); *F02D 41/04* (2013.01); *F02D 41/2467* (2013.01); *F02D 41/405* (2013.01); *F02M 63/0225* (2013.01); *F02M 65/001* (2013.01); *F02D 2200/0614* (2013.01)

(58) Field of Classification Search
CPC ...... F02D 41/40; F02D 41/402; F02D 41/403; F02D 41/405; F02B 23/101; F02B 23/104; F02B 23/105; F02B 2023/103; F02M 61/1813; F02M 61/1833; F02M 61/1826
USPC ............................... 123/294, 299, 304, 305
See application file for complete search history.

(56) References Cited

U.S. PATENT DOCUMENTS

| 3,933,130 A * | 1/1976 | Csicsery | F02M 1/16 123/3 |
| 4,854,127 A * | 8/1989 | Vinson | F23D 17/00 60/742 |
| 5,730,110 A * | 3/1998 | Nelson | F02D 7/02 123/588 |
| 5,970,715 A * | 10/1999 | Narang | F02C 7/04 60/726 |
| 9,593,637 B2 | 3/2017 | Surnilla et al. | |
| 2003/0226399 A1 | 12/2003 | Clingerman et al. | |
| 2008/0307870 A1 | 12/2008 | Chemello | |
| 2010/0147058 A1 | 6/2010 | Cinpinski et al. | |
| 2015/0059700 A1* | 3/2015 | Leone | F02D 19/0671 123/445 |
| 2016/0377019 A1* | 12/2016 | Russ | F02D 41/221 123/486 |
| 2018/0334982 A1* | 11/2018 | Sanborn | F02D 41/402 |
| 2018/0334984 A1* | 11/2018 | Thomas | F02D 41/402 |

* cited by examiner

*Primary Examiner* — John Kwon
(74) *Attorney, Agent, or Firm* — Geoffrey Brumbaugh; McCoy Russell LLP

(57) ABSTRACT

Methods and systems are disclosed for operating an engine that includes fuel injectors that supply fuel to cylinders of the engine. According to the methods and system, variation of individual fuel injection amounts injected by a sole fuel injector are determined so that it may be determined if individual fuel injector variation may be contributing to engine air-fuel ratio variation.

11 Claims, 10 Drawing Sheets

METHOD AND SYSTEM FOR DETERMINING FUEL INJECTOR VARIABILITY

FIELD

The present application relates to methods and systems for determining and compensating variability of a sole fuel injector of an internal combustion engine so that engine air-fuel ratio control may be improved.

BACKGROUND/SUMMARY

An engine may include a plurality of fuel injectors that supply fuel to the engine. Each of the plurality of fuel injectors may inject a slightly different amount of fuel for a given fuel injector voltage pulse command. A first fuel injector may inject slightly more fuel (e.g., 1.1 milligram of fuel) for a 1 millisecond voltage pulse than a second fuel injector (e.g., 0.9 milligram). These type of offset fuel injection errors may be compensated by adjusting a transfer function (e.g., a function stored in controller memory that defines a relationship between amount of fuel injected and fuel injector voltage pulse width) of a fuel injector so that the amount of fuel injected by a fuel injector is closer to an amount of fuel commanded to be injected by the fuel injector. However, the engine's air-fuel ratio may still not meet expectations such that the engine's air-fuel ratio deviates from a desired or requested engine air-fuel ratio. Engine emissions may increase when the engine's actual air-fuel ratio does not match the desired or requested engine air-fuel ratio. Therefore, it may be desirable to determine the source of the engine air-fuel ratio variation and to perform mitigating actions.

The inventors herein have developed an engine operating method, comprising: commanding a sole fuel injector to inject a first amount of fuel a plurality of times via a controller during a characterization procedure for the sole fuel injector; and performing a mitigating action via the controller in response to a statistical characteristic of a plurality of fuel injection amounts generated via commanding the sole fuel injector to inject the first amount of fuel the plurality of times.

By commanding a sole fuel injector to inject a predetermined fuel amount a plurality of times, it may be possible to provide the technical result of determining variation in an amount of fuel injected by the sole injector so that it may be determined whether or not the sole fuel injector is operating as desired. If it is determined that the sole fuel injector is not injecting fuel as desired, a second fuel injector may supply fuel to the cylinder that receives fuel from the sole fuel injector. Alternatively, the sole fuel injector may not be activated in selected injection amount regions so that unintended air-fuel ratios may be avoided.

The present description may provide several advantages. In particular, the approach may improve engine air-fuel ratio control. Further, the approach may provide a way of selecting which of two injectors that may inject fuel to an engine cylinder actually gets to inject fuel to the cylinder. Further still, the approach may generate unique ballistic and transitional operating regions for each fuel injector so that improved fuel injector performance may be improved. Additionally, injector operation where shot-to-shot variability is higher than a threshold may be avoided and the shot-to-shot variability may be assessed in real time, not a priori.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
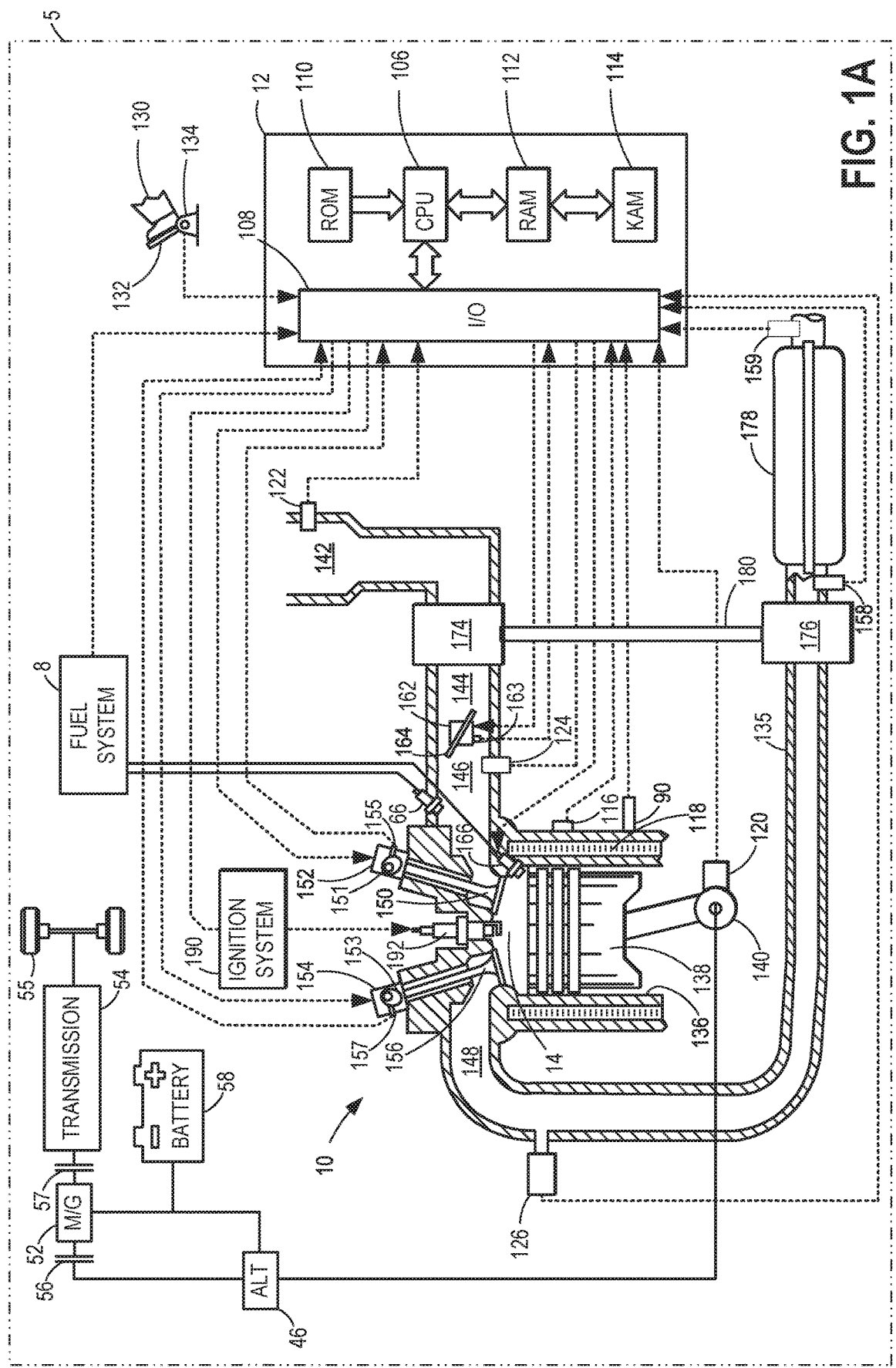
FIG. 1A shows a schematic depiction of an engine system of a vehicle.
Figure 1B:
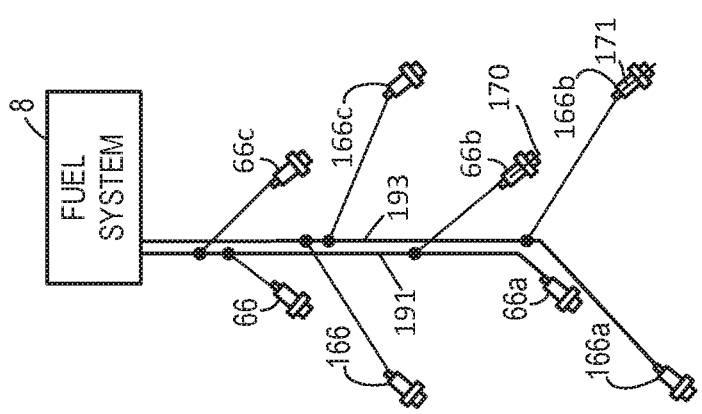
FIG. 1B shows a schematic depiction of a fuel system included in the engine system of FIG. 1A.
Figure 7A:
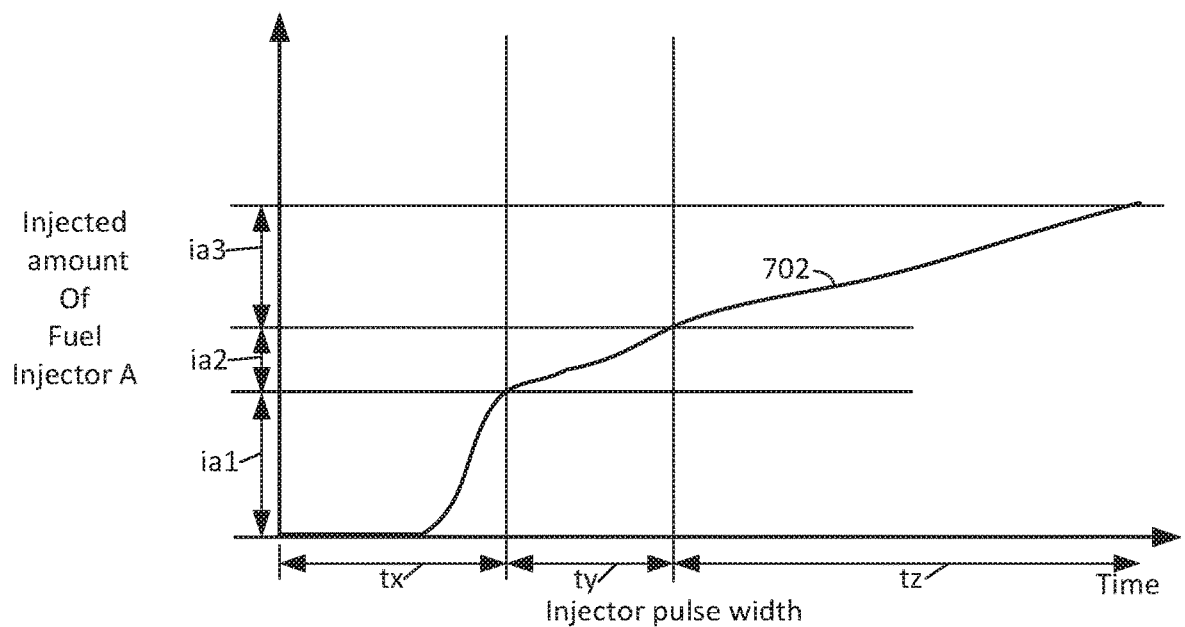
FIGS. 7A and 7B show a ballistic region, a transition region, and a full lift fuel injector operating region for two example fuel injectors.
Figure 7B:
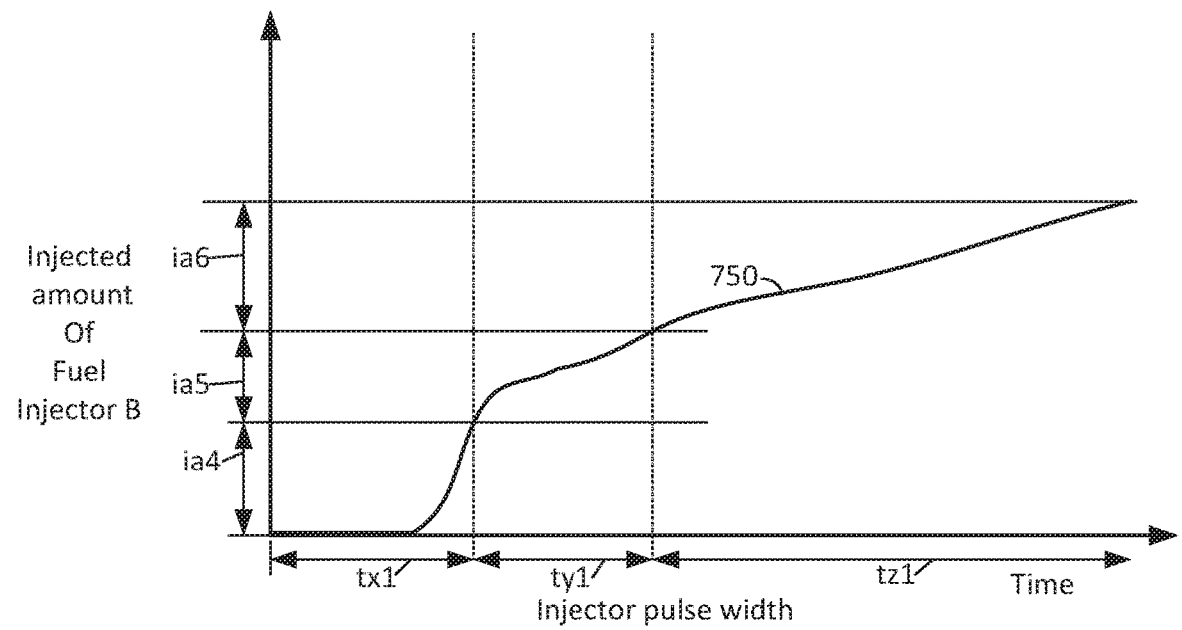
Figure 8:
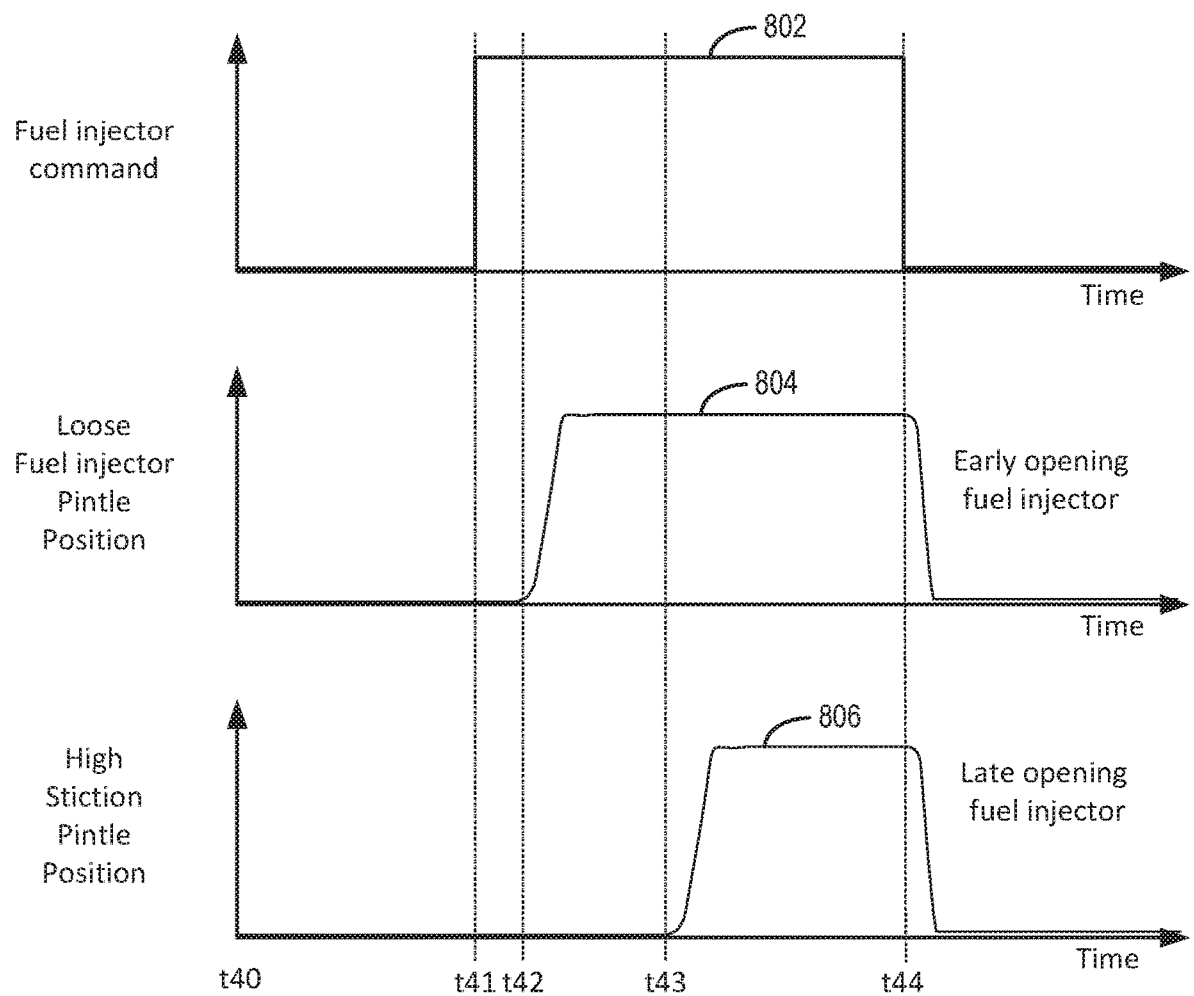
FIG. 8 shows plots illustrating potential issues with fuel injector operation.
Figure 9:
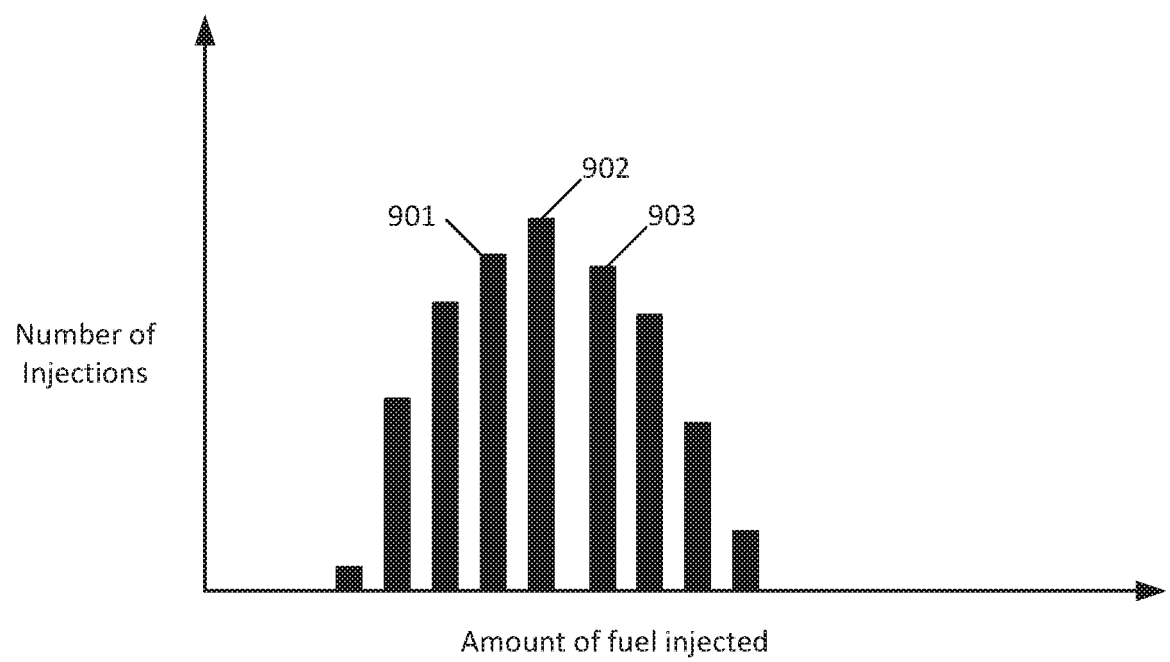
FIGS. 9 and 10 show histograms of two different example fuel injector distributions.
Figure 10:
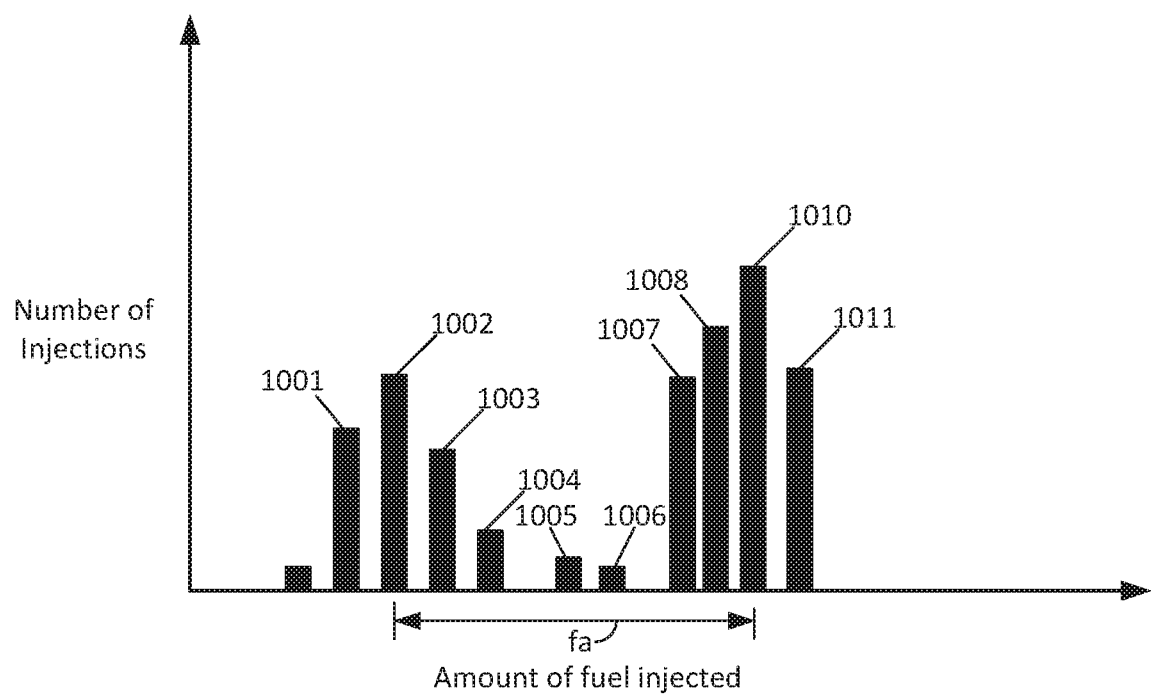

The following description relates to systems and methods for operating an engine that includes fuel injectors. The fuel injectors may be direct fuel injectors, port fuel injectors, or a mixture of direct and port fuel injectors. The engine may be of the type that is shown in FIGS. 1A and 1B. The engine may be operated according to the methods of FIGS. 2-4. A sequence or procedure to determine variation in an amount of fuel injected by a fuel injector is shown in FIG. 5. Fuel injector pintle trajectories for operating a fuel injector in ballistic and full lift modes are show in FIGS. 6A and 6B. FIGS. 7A and 7B show how ballistic, transition, and full lift modes of a fuel injector may be different for two of a same type of fuel injector. Example pintle trajectories for two different fuel injectors of a same type are shown in FIG. 8. Example distributions of amounts of fuel injected are shown in FIGS. 9 and 10.

Turning now to the figures, FIG. 1A depicts an example of a cylinder 14 of an internal combustion engine 10, which may be included in a vehicle 5. Engine 10 may be controlled at least partially by a control system, including a controller 12, and by input from a human vehicle operator 130 via an input device 132. The controller 12 receives signals from the various sensors shown in FIGS. 1A and 1B and employs the actuators shown in FIGS. 1A and 1B to adjust engine and driveline operation based on the received signals and instructions stored in memory of controller 12.

In this example, input device 132 includes an accelerator pedal and a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1A shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1A, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1A, exhaust gas sensor 126 is a UEGO sensor. Emission control device 178 may be a three-way catalyst, a NOx trap, various other emission control devices, or combinations thereof. In the example of FIG. 1A, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way, but it injects fuel to the intake port of cylinder 14 upstream of intake poppet valve 150. In this manner, fuel injector 166 provides what is known as direct injection (hereafter also referred to as "DI") of fuel into cylinder 14. While FIG. 1A shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline, or both may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition), one or multiple injections of fuel may be performed per cycle via either or both injectors. The multiple DI injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1A as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations (e.g., caused by knock) via vibration sensing knock sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1A and employs the various actuators of FIG. 1A to adjust engine operation based on the received signals and instructions stored on a memory of the controller.

As described above, FIG. 1A shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1A with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Referring now to FIG. 1B, a more detailed description of the fuel system 8 shown in FIG. 1A is provided. The fuel system 8 includes a first fuel rail 191 and a second fuel rail 193. First fuel rail 191 may supply a same type of fuel as supplied by second fuel rail 193. Alternatively, first fuel rail 191 may supply a different type of fuel as supplied by second fuel rail 193. Fuel injectors 166 and 66 are configured to inject fuel to cylinder number one (e.g., shown in FIG. 1A). Fuel injectors 166a and 66a are configured to inject fuel to cylinder number two (not shown). Fuel injectors 166b and 66b are configured to inject fuel to cylinder number three (not shown). Fuel injectors 166c and 66c are configured to inject fuel to cylinder number four (not shown). Fuel injector 66b is shown with pintle or needle 170 and fuel injector 166b is shown with pintle or needle 171. The each of the other fuel injectors also include pintle 170 or 171, but which are not shown.

Thus, the system of FIGS. 1A and 1B provides for a system for operating an engine, comprising: an engine including a first fuel injector to inject fuel to an engine cylinder; and a controller including executable instructions stored in non-transitory memory to adjust operation of the first fuel injector in response to a bimodal fuel injection distribution produced via the first fuel injector. The system further comprises additional instructions to adjust operation of a second fuel injector in response to the bimodal fuel injection distribution produced via the first fuel injector. The system includes where adjusting operation of the first fuel injector includes not injecting fuel via the first fuel injector in a region of fuel injection amounts for the cylinder. The system includes where adjusting operation of the second fuel injector includes injecting fuel via the second fuel injector in the region of fuel injection amounts for the cylinder. The system includes where the bimodal fuel injection distribution is produced via commanding a sole amount of fuel injected. The system further comprises additional instructions to adjust operation of the second fuel injector in response to a bimodal fuel injection distribution produced via the second fuel injector.

Figure 2:
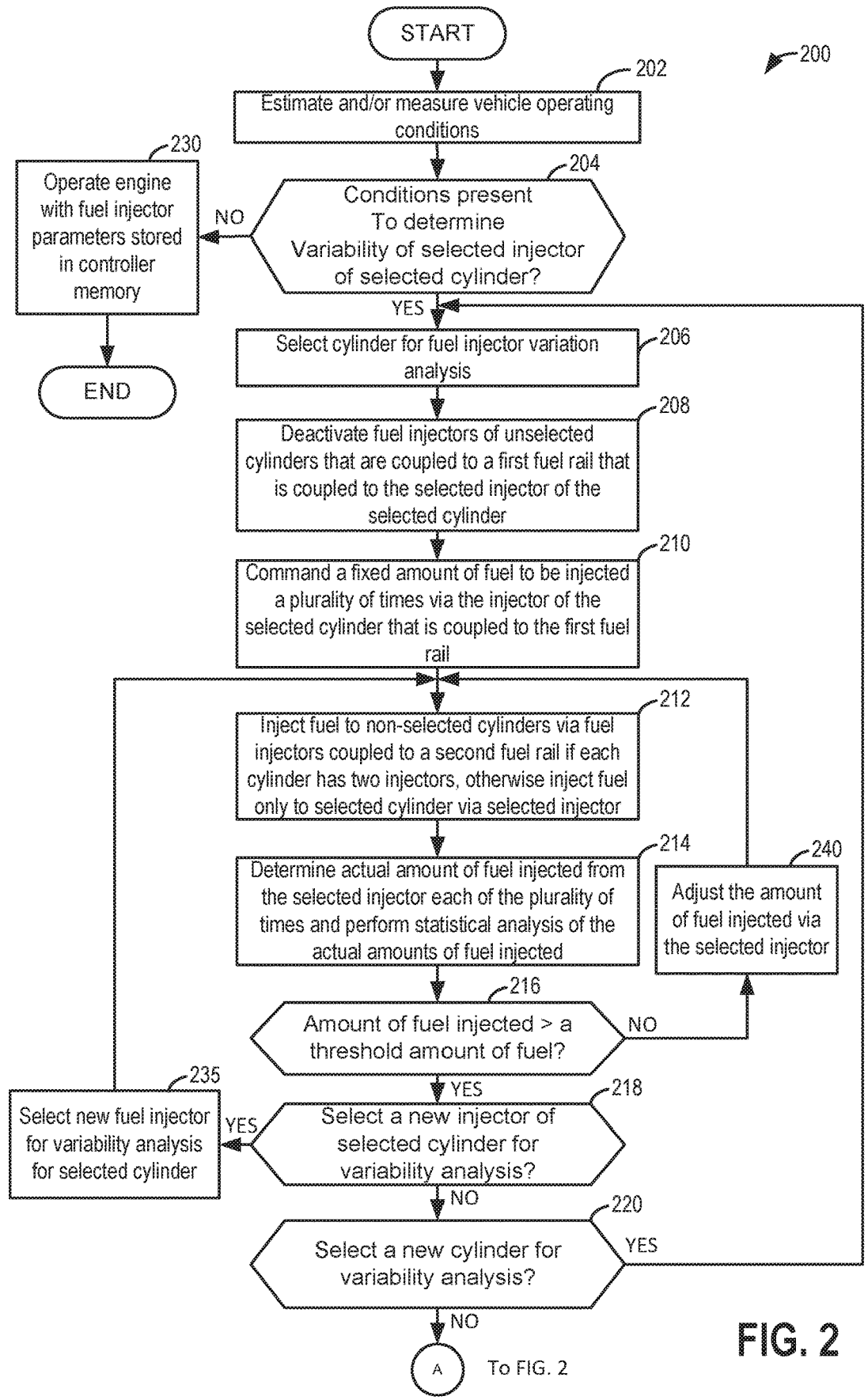
FIGS. 2 and 3 show an example method for determining amount of fuel injected variation for a sole fuel injector and the method may be applied to all of an engine's fuel injectors.
Figure 3:
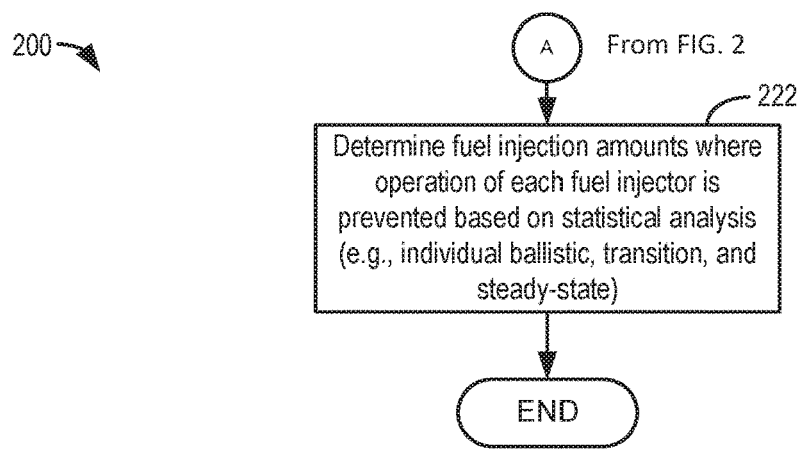

Referring now to FIGS. 2 and 3, a method for operating an engine is shown. The method of FIGS. 2-6B may be included in and may cooperate with the system of FIGS. 1A and 1B. At least portions of method 200 may be incorporated in the system of FIGS. 1A and 1B as executable instructions stored in non-transitory memory. In addition, other portions of method 200 may be performed via a controller transforming operating states of devices and actuators in the physical world. The controller may employ engine actuators of the engine system to adjust engine operation. Further, method 200 may determine selected control parameters from sensor inputs. The methods of FIGS. 2-4 may provide the sequences of FIG. 5.

At 202, method 200 determines vehicle and engine operating conditions via the sensors described in FIG. 1A. Method 200 may determine operating conditions including but not limited to engine speed, engine load, engine temperature, ambient temperature, fuel injection timing, operating hours, distance driven by a vehicle, engine position, driver demand torque, and engine air flow. Method 200 proceeds to 204.

At 204, method 200 judges if conditions are present for determining variability of amounts of fuel injected via a sole selected fuel injector of a cylinder of an engine. In one example, method 200 may be performed as part of an end of line sequence after a vehicle is manufactured. Further, method 200 may be performed after a vehicle has traveled a predetermined distance or if an actual engine air-fuel is deviating more than may be desired from a requested engine air-fuel ratio.

In addition, method 200 may be performed in response to other predetermined vehicle conditions. For example, method 200 may be performed as part of a cold engine start routine at different engine starting temperatures. Thus, method 200 may be performed when engine temperature is −20° C., 0° C., 10° C., 20° C., 40° C., etc. By performing method 200 at cold starting temperatures and conditions, it may be possible to characterize fuel injector operation during conditions where it may be more likely for some fuel injectors to stick and inject different amounts of fuel when only a constant amount of fuel is requested to be injected. Further, method 200 may be performed during warm engine starts (e.g., starts when engine temperature is between 40° C. and 100° C.). By performing method 200 during engine starts, it may be possible to determine fuel injection amount variation of a fuel injector during conditions where the possibility of fuel injection amount variation is greatest. Method 200 may also be performed during conditions of opportunity so that any effect on engine operation may be reduced. For example, method 200 may be performed during conditions of deceleration fuel cut-off (e.g., rotating the engine while not injecting fuel to the engine for one or more engine cycles) where fuel may be injected to a cylinder and discharged to the exhaust system to improve catalyst efficiency before restarting engine cylinders so that fuel may be injected in smaller or larger amounts without affecting engine torque production. In addition, method 200 may be performed during steady-state conditions such as engine idle or during cruise conditions where engine air flow may be relatively constant. If method 200 judges that conditions are present to determine variability of fuel injectors, then the answer is yes and method 200 proceeds to 206. Otherwise, the answer is no and method 200 proceeds to 230.

In some examples, multiple fuel injections may be performed in one cylinder cycle, provided that most of the energy has been dissipated from the fuel injector coil. The time it takes for fuel injector coil energy to dissipate may be experimentally determined.

At 230, method 200 operates the engine and fuel injectors with the fuel injector ballistic, transitional, and full lift regions that have previously been determined. Further, method 200 may make adjustments to fuel injector timings (e.g., start of fuel injection timing and end of fuel injection timing to increase or decrease fuel injection timing to provide a requested or desired amount of fuel to an engine cylinder) based on statistical fuel injection attributes that have already been determined and stored to controller memory. For example, if a first fuel injector exhibits a bimodal fuel injection amount distribution within a range of requested fuel injection amounts (e.g., between 3.5 and 4.5 milligrams of injected fuel amount), then method 200 may not activate the first fuel injector to inject fuel amounts to a first cylinder in this range of requested fuel injection amounts. Instead, the first fuel injector may inject a lesser or greater amount of fuel so that the first fuel injector does not attempt to inject an amount of fuel that is in the range of requested fuel injection amounts where the fuel injector exhibits a bimodal fuel injection amount distribution. An amount of fuel injected to a second cylinder may be adjusted so that the amount of fuel injected to the engine balances to a desired amount. For example, if the first fuel injector injects 0.05 less milligrams of fuel than is requested into cylinder number one, then a second fuel injector that injects fuel to cylinder number two may inject 0.05 more milligrams of fuel to cylinder number two so that the overall amount of fuel injected to the engine meets the requested amount of fuel.

For a group of eight direct injection fuel injectors where transition zones of all fuel injectors are considered to set the size of the transition zone, a fairly wide transition zone may be needed. However, for a given injector, the transition zone is much narrower when the fuel injector is up to operating temperature. The variability information from an individual fuel injector may be used to discover the transition zone (which has a high variability). And, each individual fuel injector may be operated according to its own transition region, which is much smaller than the transition region for all fuel injectors. Consequently, larger fuel injector operating regions may be provided for each fuel injector.

In another example, if a first fuel injector exhibits a bimodal distribution of fuel injection amounts within a range of requested fuel injection amounts, then a second fuel injector may instead inject fuel to a same cylinder as the first fuel injector (e.g., the first and second injectors inject fuel to cylinder number one) when the requested or desired amount of fuel to be injected is within the range of requested fuel injection amounts where the first fuel injector exhibits a bimodal distribution of fuel injection amounts.

Method 200 may also adjust fuel injection timings (e.g., start of injection time and end of injection time) to adjust the amount of fuel injected based on the standard deviation, coefficient of variation, variance, and range. For example, if a standard deviation of an amount of fuel injected by a first fuel injector is greater than a threshold, then the first fuel injector may be deactivated in a range of requested fuel injection amounts where the standard deviation of the injected fuel amount exceeds a threshold. Likewise, the first fuel injector may be deactivated in a range of requested injection amounts when a coefficient of variation, a variance, and or a range parameter is greater than a threshold value. Further, a second fuel injector may be activated in place of the first fuel injector so that fuel may be injected into a cylinder by the second fuel injector instead of the first fuel injector so that the cylinder may remain activated. Method 200 proceeds to exit.

At 206, method 200 selects a cylinder and injector of the cylinder for variation analysis. If the cylinder has two fuel injectors, only one is selected for variation analysis. The other fuel injector may be operated to provide a desired or requested amount of fuel that is based on a desired or requested air-fuel ratio for the cylinder. The selected fuel injector for the cylinder may be based on the engine's present speed and load. For example, a direct fuel injector for the cylinder may be selected if a port fuel injector of the cylinder may inject a desired amount of fuel that allows the engine to operate in a desired manner. If the port fuel injector may not operate the cylinder in the desired manner, then the port fuel injector may be selected for variation analysis and the direct fuel injector may be operated to supply the cylinder with a requested amount of fuel. If the engine is operating in conditions where combustion in the cylinder is not requested (e.g., during deceleration fuel cut-off), either the direct or port fuel injector may be selected for fuel injector variation analysis. If the cylinder includes only one fuel injector, then the only one fuel injector may be selected for fuel injector variation analysis during conditions when injecting predetermined amounts of fuel is not expected to be noticed via vehicle occupants (e.g., during deceleration fuel cut-off). Further, selection of the fuel injector to be analyzed may be based on a priority level for the cylinders fuel injectors. In one example, if the selected cylinder includes a direct fuel injector and a port fuel injector, then the direct fuel injector may undergo variance analysis, followed by the port fuel injector undergoing variation analysis.

The cylinder having fuel injectors that undergo variation analysis may be selected in a predetermined order. For example, the cylinders may be selected in an ascending cylinder number order (e.g., 1-2-3-4). Alternatively, the cylinders may be selected according to a firing order of the engine (e.g., 1-3-4-2). Method 200 selects the cylinder and injector that injects fuel to the cylinder for fuel injection amount variation analysis and then proceeds to 208.

At 208, method 200 deactivates fuel injectors of unselected cylinders that are coupled to a same fuel rail as the injector that is selected at 206. For example, if a first direct fuel injector of cylinder number one is selected for fuel injection amount analysis and the first direct fuel injector is coupled to a first fuel rail, then direct fuel injectors for cylinders two, three, and four of a four cylinder engine are deactivated. Fuel injectors that are not coupled to the first fuel rail, may remain activated so that the engine may operate (e.g., combust fuel while rotating). For example, fuel injectors of the selected cylinder and unselected cylinders that are coupled to a second fuel rail may remain active so that the engine may rotate under its own power while the fuel injector variation analysis is performed.

It is not necessary to deactivate other direct injection fuel injectors to test a particular injector. The direct injector's resultant pressure drop is computed by taking the difference of two "inter-injection pressures." This testing necessarily operates at declining pressures, thus it may help to disable the other injectors to keep the pressure nearer to constant during injections. However, the direct fuel injector may be operated at selected injection pulse widths since the fuel rail pressure declines from injection to injection. This results in declining fuel injection amounts. Thus, it may be useful to rely on a PFI injector to make up the difference in requisite fuel.

In addition, fuel pressure in the fuel rail that is coupled to the selected fuel injector is increased to a threshold pressure and then fuel flow from a fuel pump to the fuel rail that is coupled to the selected fuel injector is ceased. Pressure may be maintained in the fuel rail via a check valve until the selected fuel injector begins to inject fuel. Method 200 proceeds to 210.

At 210, method 200 commands a fixed amount of fuel to be injected via the selected fuel injector to the selected cylinder a predetermined of times (e.g., a plurality of times). In one example, the initial fixed amount of fuel to be injected is within a ballistic operating region of the newly selected fuel injector. Fuel is injected from the selected fuel injector a predetermined number of times so that a statistical analysis of the actual amount of fuel injected to the cylinder may be determined. The predetermined number of injections may be provided in a single cycle of the cylinder, or alternatively, over several cylinder cycles (e.g., one injection for each cylinder cycle). The fuel is injected according to the command. Method 200 proceeds to 212.

At 212, method 200 may inject fuel to cylinders that are not selected via fuel injectors that are not coupled to the fuel rail that is coupled to the fuel injector that is selected for fuel injector variation analysis. If the engine is operating (e.g., combusting fuel and rotating under its own power), fuel may be injected to cylinders that are not selected via fuel injectors that are coupled to a different fuel rail than the selected fuel injector. For example, if a first direct fuel injector of cylinder number one is selected for fuel injection amount analysis and the first direct fuel injector is coupled to a first fuel rail, then port fuel injectors for cylinders two, three, and four of a four cylinder engine may be commanded to inject fuel to cylinders numbered two, three, and four. Thus, fuel may be injected to all engine cylinders, but fuel is only drawn from the fuel rail that is coupled to the selected fuel injector by the selected fuel injector so that the amount of fuel that is injected by the selected cylinder during each injection of fuel may be determined. In this way, the fuel pressure drop in the fuel rail that is coupled to the selected fuel injector may only be affected by the selected fuel injector. Further, by continuing to inject fuel to other cylinders, the engine may continue to operate with little or no knowledge of vehicle passengers being aware of the diagnostics being performed.

If the engine is operating in a deceleration fuel cut-off mode where injection is stopped to engine cylinders when the fuel injector variation analysis procedure begins, then fuel may be injected via only the selected fuel injector into the selected engine cylinder. Method 200 proceeds to 214.

At 214, method 200 determines an actual amount of fuel that is injected each time the selected fuel injector injects fuel to the selected cylinder. In one example, method 200 may determine an amount of fuel injected during each individual fuel injection via the following equations:

$$\text{Act\_vol\_inj} = \frac{Fuel_{pdrop} \cdot RV}{BM} \quad (1)$$

$$\text{Act\_mass\_inj} = Act_{vol_{inj}} \cdot \text{Density} \quad (2)$$

where Act_vol_inj is the actual volume of fuel injected during a single fuel injection, Fuelpdrop is the pressure drop in the fuel rail due to the single fuel injection, BM is the bulk modulus of fuel (e.g., 700 MPa), RV is the fuel rail volume (e.g. 60 ml), Density is the fuel density (e.g., 0.75 g/ml), and Act_mass_inj is the actual mass of fuel injected during the single fuel injection. Method 200 determines the amount of fuel injected for each time the selected fuel injector injects fuel to the selected cylinder. The individual fuel amounts are stored in controller memory.

To compare what was intended to be injected to what was actually injected, the actual fuel mass injected is subtracted from the intended fuel mass to be injected. Method 200 also performs statistical analysis of the amounts of fuel that have been determined to have been injected by the selected fuel injector. In one example, method 200 determines the standard deviation of the amounts of fuel injected by the selected fuel injector. Method 200 may also determine the range, coefficient of variation, and variation in the amounts of fuel injected by the selected fuel injector. The statistical values are determined for all the fuel injections that were performed when the fuel was injected at the commanded fixed amount. These values may be stored in controller memory and they may be indexed or referenced via the requested or commanded amount of fuel to be injected or, alternatively, the fuel injection pulsewidth and the identity of the selected injector (e.g., direct or port injector of cylinder number one). Method 200 may also determine if the fuel injector's fuel amount distribution is normal like or bimodal as described at FIGS. 9 and 10. Method 200 proceeds to 216.

At 216, method 200 judges if the fixed amount of fuel injected by the selected injector is greater than a threshold amount of fuel. In one example, the threshold amount of fuel is an upper bounds fuel amount to be injected by the selected fuel injector. In one example, the threshold amount of fuel to be injected is within a full lift region of selected fuel injector. If method 200 judges that the fixed amount of fuel that was injected by the selected fuel injector is greater than the threshold amount of fuel, the answer is yes and method 200 proceeds to 218. Otherwise, the answer is no and method 200 proceeds to 240.

At 240, the amount of fuel commanded to be injected by the selected fuel injector is increased by a predetermined amount. By increasing the amount of fuel injected, it may be possible to detect regions or ranges where actual amounts of fuel injected responsive to commanded amounts of fuel to be injected have desirable or less desirable statistical properties. Fuel rail pressure may also be increased to a threshold pressure so that there is sufficient pressure in the fuel rail to maintain fuel injection. Method 200 returns to 212.

At 218, method 200 judges if it is desired to select a new fuel injector for the selected cylinder to perform fuel injection amount variation analysis. In one example, method 200 may judge that it is desired to select a new fuel injector for the selected cylinder to perform fuel injection amount variation analysis on when at least one of the selected cylinders has not had fuel injection amount variation analysis performed. If method 200 judges that it is desired to select a new fuel injector for the selected cylinder to perform fuel injection amount variation analysis on, the answer is yes and method 200 proceeds to 235. Otherwise, the answer is no and method 200 proceeds to 220. It is also possible to test multiple cylinder's injectors concurrently.

At 235, method 200 selects a new fuel injector to perform the fuel amount injected analysis procedure on. Thus, if the selected cylinder includes a port injector and fuel amount injected analysis has been performed on the direct fuel injector, then the port fuel injector of the selected cylinder is selected. Method 200 also determines a fixed amount of fuel to be injected by the newly selected injector. In one example, the initial fixed amount of fuel to be injected is within a ballistic operating region of the newly selected fuel injector. Fuel rail pressure may also be increased to a threshold pressure so that there is sufficient pressure in the fuel rail to maintain fuel injection. Method 200 returns to 212.

At 220, method 200 judges if it is desired to select a cylinder for performing fuel injection amount variation analysis. In one example, method 200 may judge that it is desired to select a new cylinder to perform fuel injection amount variation analysis on when not all of the engine's cylinders have had fuel injection amount variation analysis performed on them. In one example, a next cylinder in the order of cylinders is selected if fuel injection amount variation analysis has not been performed on all engine cylinders. If method 200 judges that it is desired to select a new cylinder for performing fuel injection amount variation analysis on, the answer is yes and method 200 returns to 206 after selecting the new cylinder. Otherwise, the answer is no and method 200 proceeds to 222.

Thus, method 200 selects fuel injectors and cylinders until fuel injection amount statistical analysis has been performed on all fuel injectors in all engine cylinders. Further, although not explicitly shown, method 200 may exit in response to select changes in operating conditions. For example, method 200 may exit at one of the illustrated steps when driver demand torque increases or when the engine exits deceleration fuel cut-off, then resume at a later time to resume the procedure.

At 222, method 200 determines regions where each of the engine's cylinders may not be operated based on the determined statistical properties of the fuel injectors. In one example, method 200 may prevent fuel injectors from injecting fuel for a range of requested or commanded fuel injection amounts. For example, if a standard deviation threshold is 1.75 and a fuel injector has the following standard deviations when injecting the specified fuel amounts: 1 milligram (mg), standard deviation ($\sigma$) 1.2; 1.5 mg, $\sigma$=1.2; 2.5 mg, $\sigma$=1.2; 3.5 mg, $\sigma$=1.2; 4 mg, $\sigma$=2; 5.0 mg, $\sigma$=2.2; 6.0 mg, $\sigma$=1.8; 6.5 mg, $\sigma$=1.3; 7 mg, $\sigma$=1.1; 8.5 mg, $\sigma$=1.0; 9.5 mg, $\sigma$=1.05; and 11.5 mg, $\sigma$=1.1; then this particular fuel injector may be prevented from injecting fuel when fuel amounts greater than 3.5 mg and less than 6.5 mg are requested or commanded. Operation of a fuel injector may be prevented for specific ranges of commanded or requested fuel injection amounts in a similar way for the fuel injector's coefficient of variation, range, and variance. However, as previously mentioned, if one fuel injector is prevented from injecting fuel based on the fuel injector's statistical attributes, then the cylinder's second fuel injector may inject the requested or commanded amount of fuel, if the cylinder includes two fuel injectors. This may allow the cylinder to remain activated and to combust the commanded or requested air-fuel ratio in the cylinder. The cylinder's requisite fuel is the sum of the fuel injected by both injectors (with the possibility of multiple injections on any given injector). The fuel injector's behavior may be indexed via fuel injector pulse width and fuel rail pressure. The pulse width may be used because it is opening time and pressure may be used because the inward-opening injectors have a differing force-to-open depending on fuel pressure.

It should be noted that each fuel injector may have different statistical attributes (e.g., standard deviation, etc.) for the different amounts of fuel that may be requested or commanded to be injected. However, ranges of fuel injection amounts where the individual fuel injectors are permitted to inject fuel and ranges of fuel injection amounts where the individual fuel injectors are not permitted to inject fuel is based on the individual fuel injectors statistical attributes and not the attributes of the other fuel injectors. This allows operation of individual fuel injectors to be optimized rather than being constrained to lumped statistical attributes of all the fuel injectors. Consequently, a first fuel injector of a first cylinder may have a larger ballistic operating region and a smaller transition region than a second fuel injector of a second cylinder. As such, the first fuel injector may supply greater amounts of fuel in its ballistic operating range than the second fuel injector may supply in its ballistic operating range.

For example, a first fuel injector may have the following statistical attributes: 1 mg, $\sigma$=1.2; 1.5 mg, $\sigma$=1.2; 2.5 mg, $\sigma$=1.2; 3.5 mg, $\sigma$=1.2; 4 mg, $\sigma$=2; 5.0 mg, $\sigma$=2.2; 6.0 mg, $\sigma$=1.8; 6.5 mg, $\sigma$=1.3; 7 mg, $\sigma$=1.1; 8.5 mg, $\sigma$=1.0; 9.5 mg, $\sigma$=1.05; and 11.5 mg, $\sigma$=1.1. A second fuel injector may have the following statistical attributes: 1 mg, $\sigma$=1.1; 1.5 mg, $\sigma$=1.1; 2.5 mg, $\sigma$=1.3; 3.5 mg, $\sigma$=1.25; 4 mg, $\sigma$=1.3; 5.0 mg, $\sigma$=2.1; 6.0 mg, $\sigma$=1.6; 6.5 mg, $\sigma$=1.25; 7 mg, $\sigma$=1.2; 8.5 mg, $\sigma$=1.1; 9.5 mg, $\sigma$=1.2; and 11.5 mg, $\sigma$=1.22. If the standard deviation threshold is 1.75, then the first fuel injector may inject fuel when between 1 mg and 3.5 mg is requested or commanded, not inject fuel when greater than 3.5 mg and less than 6.5 mg of fuel is requested or commanded, and inject fuel when greater than 6.5 mg of fuel is requested. Conversely, the second fuel injector may inject fuel when between 1 mg and 4 mg is requested or commanded, not inject fuel when greater than 4 mg and less than 6.0 mg of fuel is requested or commanded, and inject fuel when greater than 6.0 mg of fuel is requested. Thus, in this example, the second fuel injector may inject more fuel before it is stopped from injecting fuel, and then the second fuel injector may begin injecting fuel again at a lower amount than the first fuel injector for requested or commanded fuel amounts that are greater than 4 mg.

Method 200 may also evaluate shapes of distributions to determine fuel injection amounts that a specific fuel injector may be allowed or not allowed to inject fuel. For example, method 200 may preferentially prefer a near normal distribution for a requested or commanded fuel injection amount as shown in FIG. 9 over a bimodal distribution for a requested or commanded fuel injection amount as shown in FIG. 10 because the bimodal distribution may causes the engine air-fuel ratio to be on either (e.g., rich or lean) side of a desired air fuel ratio rather than concentrated near the desired air-fuel ratio. Method 200 may bin actual amounts of fuel injected by a fuel injector that is commanded to a fixed fuel injection amount to generate a histogram. The number of injections in each bin may be evaluated to determine if the fuel injector exhibits more normal or more bimodal characteristics. Method 200 may judge that the fuel injector exhibits a more normal fuel injection amount distribution when the histogram includes a single peak bin, which may be identified as a bin with a bin immediately below and a bin immediately above it as being less that the number in the bin as will be explained in greater detail with respect to FIG. 9. Method 200 may judge that the fuel injector exhibits a more bimodal fuel injection amount distribution when the histogram includes two peak bins, which may be identified as bins with a bin immediately below and a bin immediately above it as being less that the number in the bin as will be explained in greater detail with respect to FIG. 10. When method 200 judges that a fuel injector generates bimodal fuel injection amount characteristics for a commanded or requested fuel injection amount, then method 200 may prevent the fuel injector from injecting fuel at the commanded or requested fuel amount where the fuel injector's fuel injection amount distribution is bimodal. Method 200 may indicate that fuel injector degradation is present if a fuel injection amount where fuel injector fuel injection statistics are undesirable is larger than a threshold range. The indication of fuel injector degradation may be provided via a human/machine interface or via a remote computer server. Method 200 proceeds to exit.

It should be noted that while the method of FIGS. 2 and 3 describes injecting fixed amounts of fuel to determine the statistical attributes for a sole fuel injector, it should be appreciated that these statistical attributes may be determined via incrementally increasing injection amounts or in other ways without departing from the scope of the invention.

Figure 4:
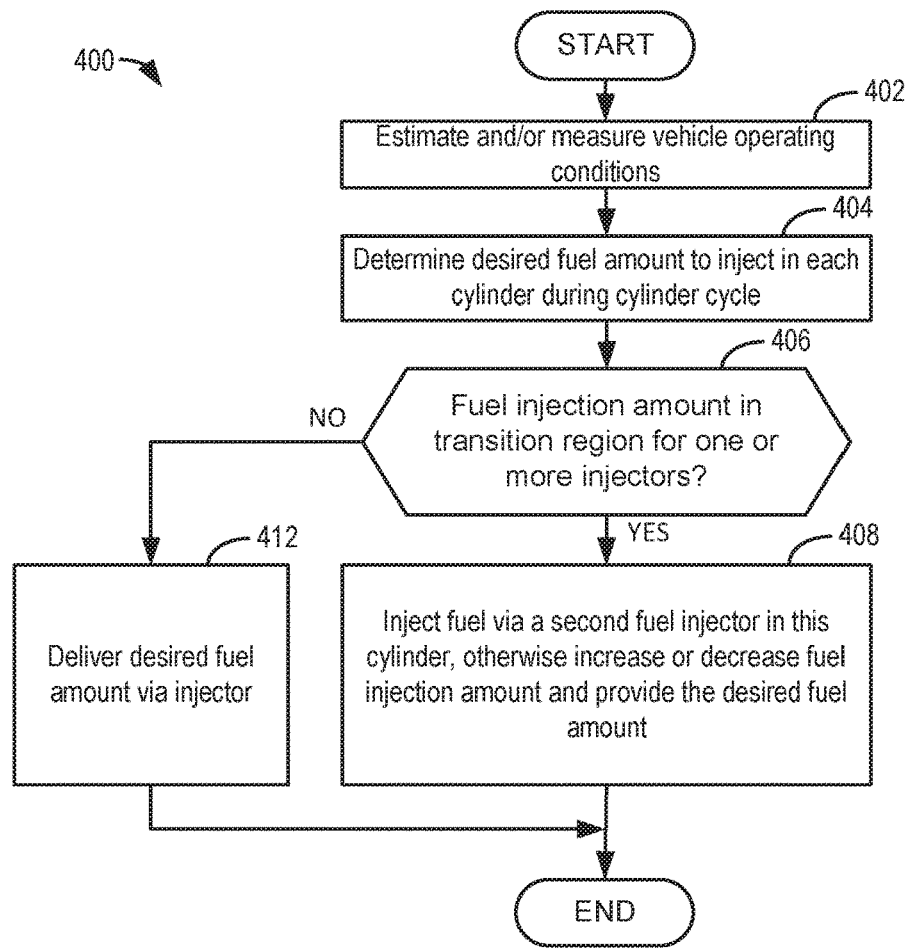
FIG. 4 shows an example for operating an engine when fuel injector variation is known.
Figure 5:
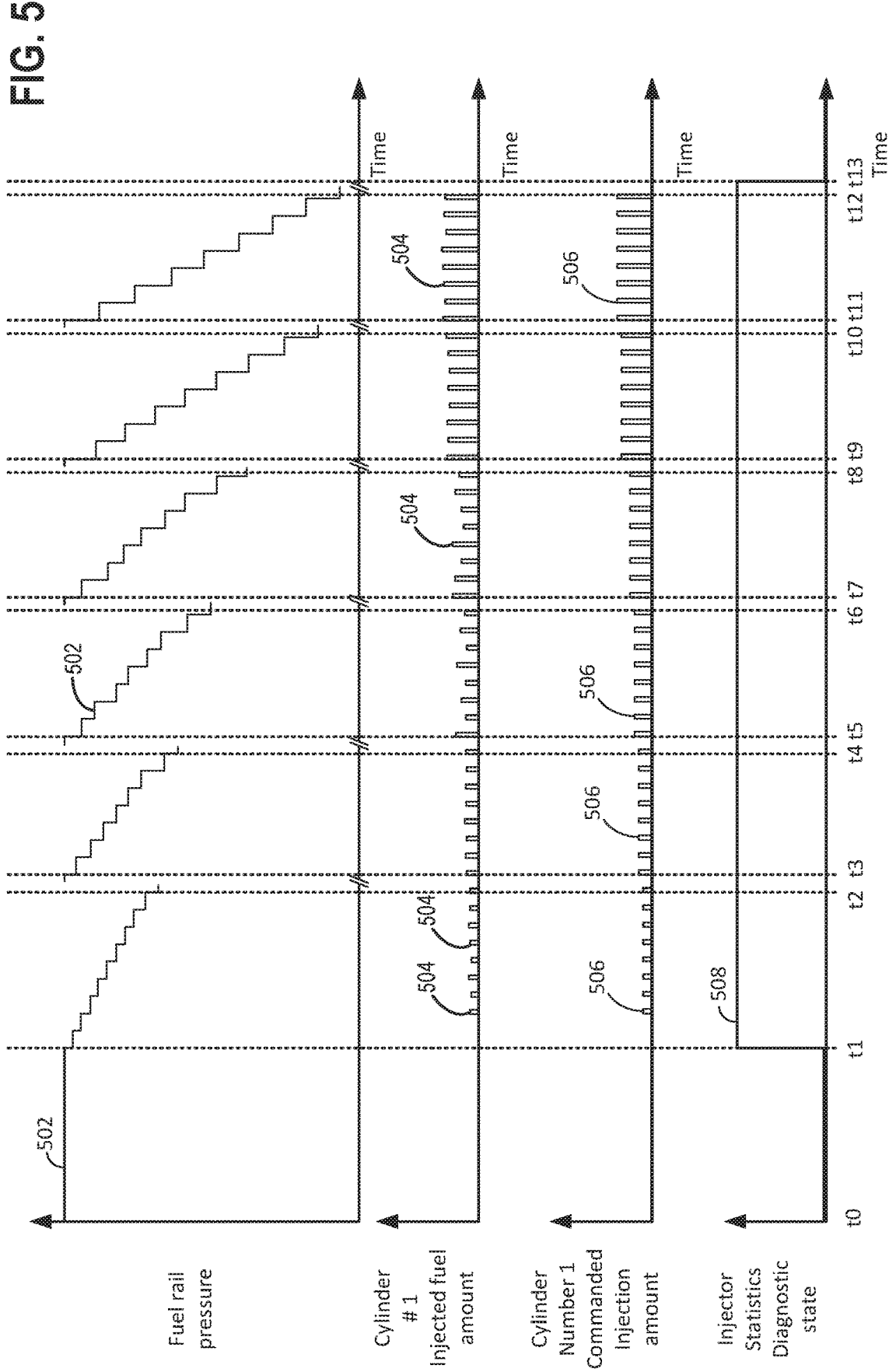
FIG. 5 is an example sequence or procedure for determining variation in an amount of fuel injected from a sole fuel injector.

Referring now to FIG. 4, a method for operating an engine is shown. The method of FIG. 4 may be included in and may cooperate with the system of FIGS. 1A and 1B. The method of FIG. 4 may also cooperate with the method of FIGS. 2 and 3. At least portions of method 400 may be incorporated in the system of FIGS. 1A and 1B as executable instructions stored in non-transitory memory. In addition, other portions of method 400 may be performed via a controller transforming operating states of devices and actuators in the physical world. The controller may employ engine actuators of the engine system to adjust engine operation. Further, method 400 may determine selected control parameters from sensor inputs. Method 400 may be performed for each fuel injector that injects fuel to a cylinder during each engine cycle.

At 402, method 400 determines vehicle and engine operating conditions via the sensors described in FIG. 1A. Method 400 may determine operating conditions including but not limited to engine speed, engine load, engine temperature, ambient temperature, fuel injection timing, operating hours, distance driven by a vehicle, engine position, driver demand torque, and engine air flow. Method 400 proceeds to 404.

At 404, method 400 determines a requested or commanded amount of fuel to inject to a cylinder. In one example, method 400 determines an amount of air flowing into each engine cylinder and multiplies an amount of air inducted into a cylinder by a desired fuel-air ratio to determine an amount of fuel to inject to a cylinder during a cycle of the cylinder. The amount of air entering the cylinder may be determined via a MAP sensor or a mass air flow meter. Method 400 proceeds to 306.

At 406, method 400 judges if the requested or commanded amount of fuel to inject to a cylinder is within a transition region of a fuel injector of a cylinder scheduled to receive fuel. The fuel injector may be a direct fuel injector or a port fuel injector. The transition region may be a region where the statistical attributes of a particular fuel injector are less than desirable such that the amount of fuel injected may vary more than may be desired. The fuel injector that is selected to inject fuel to the cylinder may be determined based on engine speed and load. For example, a port fuel injector may selected to deliver fuel at lower engine speeds and loads while the direct fuel injector may be selected to deliver fuel at higher engine speeds and loads. During some conditions, both of a cylinder's direct and port fuel injectors may be selected to inject fuel to the cylinder during the cylinder's cycle. However, a fuel injector that is selected to inject fuel based on engine speed and load may be replaced with a different fuel injector of the cylinder when the selected fuel injector injects fuel in a transitional fuel injection range or at other fuel injection amounts where the amount of fuel injected by the selected fuel injector has less than desirable statistical attributes (e.g., standard deviation, etc.). Example transitional regions are shown in FIGS. 7A and 7B. If method 400 judges that the requested amount of fuel is in the transition operating region of the fuel injector or if the statistical attributes of the fuel injector when injecting the amount of desired or requested fuel are less than desirable (e.g., exceed a threshold value), then the answer is yes and method 400 proceeds to 408. Otherwise, the answer is no and method 400 proceeds to 412. The algorithm may make a decision based on the current fuel rail pressure. However, the desired fuel rail pressure is computed for several considerations with one of those considerations potentially being transition region avoidance.

At 412, method 400 commands the selected fuel injector to inject the requested or desired amount of fuel via the fuel injector. The selected fuel injector may be the fuel injector that provides a greatest level of charge cooling or lowest engine emissions at the present engine speed and load. Method 400 proceeds to exit.

At 408, method 400 selects a second fuel injector to inject the requested or desired amount of fuel. The requested or desired fuel amount is injected via the newly selected fuel injector. The fuel injector that is within a transitional fuel injection amount range or a fuel injection amount range where the statistical attributes are not desirable is temporarily deactivated so that the engine air-fuel ratio may deviate less than may be desired. Method 400 proceeds to exit.

In this way, fuel may be injected to engine cylinders via fuel injectors that have desirable fuel injection amount statistical attributes in a fuel injection amount region. If the fuel injector does not have desirable fuel injection amount statistical attributes in a fuel injection amount region, then the fuel injector may not be activated in this fuel injection amount region.

Thus, the methods of FIGS. 2-4 provide for an engine operating method, comprising: commanding a sole fuel injector to inject a first amount of fuel a plurality of times via a controller during a characterization procedure for the sole fuel injector; and performing a mitigating action via the controller in response to a statistical characteristic of a plurality of fuel injection amounts generated via commanding the sole fuel injector to inject the first amount of fuel the plurality of times. The method includes where the mitigating action is ceasing to inject fuel via the sole fuel injector in for a range of fuel injection amounts. The method includes where the mitigating action is deactivating the sole fuel injector so that the sole fuel injector remains closed. The method includes where the statistical characteristic is a standard deviation that exceeds a threshold value.

In some examples, the method includes where the statistical characteristic is a coefficient of variation that exceeds a threshold value. The method includes where the statistical characteristic is a variance that exceeds a threshold value. The method includes where the sole fuel injector is coupled to a first fuel rail, and further comprising: deactivating all other fuel injectors that are coupled to the first fuel rail during the characterization procedure. The method includes where the sole fuel injector injects fuel to a cylinder, and further comprising: injecting fuel to the cylinder via a second fuel injector during the characterization procedure for the sole fuel injector.

The method of FIGS. 2-4 also provide for an engine operating method, comprising: adjusting operation of a fuel injector based on a bimodal fuel injection distribution produced via the fuel injector. The method further comprises operating an engine with the fuel injector and a plurality of fuel injectors including a plurality of transitional fuel injection regions. The method further comprises not operating injectors in the plurality of transitional fuel injection regions. The method includes where adjusting operation of the fuel injector includes avoiding operating the fuel injector in a transition region of the fuel injector. The method includes where the transition region is related to the bimodal distribution. The method includes where the bimodal distribution is determined via performing a plurality of fuel injections via the fuel injector.

In another representation, the methods of FIGS. 2-4 also provide for an engine operating method, comprising: operating an engine with a plurality of fuel injectors including a plurality of ballistic fuel injection regions via a controller, each of the plurality of ballistic fuel injection regions based on amounts fuel injected via a sole fuel injector, the sole fuel injector different for each of the plurality of ballistic fuel injection regions. The method further comprises operating the engine with the plurality of fuel injectors including a plurality of transitional fuel injection regions. The method further comprises not operating injectors in the plurality of transitional fuel injection regions. The method further comprises determining a plurality of upper fuel injection amounts that define upper boundaries for the plurality of ballistic fuel injection regions. The method includes where determining the plurality of upper fuel injection amounts that define upper boundaries for the plurality of ballistic fuel injection regions includes commanding injecting a fuel amount a plurality of times for each of the plurality of fuel injectors. The method includes where determining the plurality of upper fuel injection amounts that define upper boundaries for the plurality of ballistic fuel injection regions includes determining amounts of fuel injected for commanding injecting the fuel amount the plurality of times via pressure in a fuel rail.

Referring now to FIG. 5, a sequence or procedure for determining statistical properties of a single fuel injector for a range of fuel injection amounts is shown. The timings and signals shown in FIG. 5 may be generated via the system of FIGS. 1A and 1B. Further, the sequence may be provided via the method of FIGS. 2-4. The II marks along the horizontal axis represent a break in time and the brake duration may be long or short.

The first plot from the top of FIG. 5 is a plot of fuel rail pressure versus time. The vertical axis represents fuel rail pressure in the fuel rail that supplies fuel to injector number one. Fuel rail pressure increases in the direction of the vertical axis arrow. Trace 502 represents a fuel rail pressure. The horizontal axis represents time and the amount of time increases in the direction of the horizontal axis arrow.

The second plot from the top of FIG. 5 is a plot of an actual amount of fuel injected into cylinder number one versus time. The vertical axis represents an amount of fuel that is injected into cylinder number one via the fuel injector that is being statistically analyzed. The amount of fuel injected to the cylinder increases in the direction of the vertical axis arrow. Bars 504 represent an amount of fuel that is injected into cylinder number one, and the height of bars 504 increases as the amount of fuel injected into cylinder number one increases. Each bar represents an amount of fuel injected in a single injection. The horizontal axis represents time and the amount of time increases in the direction of the horizontal axis arrow.

The third plot from the top of FIG. 5 is a plot of a commanded or requested amount of fuel injected to be injected into cylinder number one versus time. The vertical axis represents a commanded amount of fuel to be injected into cylinder number one via the fuel injector that is being statistically analyzed. The commanded or requested amount of fuel injected to be injected to the cylinder increases in the direction of the vertical axis arrow. Bars 506 represent a commanded amount of fuel that is to be injected into cylinder number one, and the height of bars 506 increases as the commanded amount of fuel to be injected into cylinder number one increases. The horizontal axis represents time and the amount of time increases in the direction of the horizontal axis arrow.

The fourth plot from the top of FIG. 5 is a plot of a fuel injector diagnostic state indicator versus time. The vertical axis represents the fuel injector statistics diagnostic state and fuel injector statistics are being determined when trace 508 is at a higher level near the vertical axis arrow. Fuel injector statistics are not being determined when trace 508 is at a lower level near the horizontal axis. Trace 508 represents the fuel injector statistics diagnostic state. The horizontal axis represents time and the amount of time increases in the direction of the horizontal axis arrow.

At time t0, fuel injector statistics for a fuel injector that injects fuel to cylinder number one are not being determined and fuel is not being injected into cylinder number one. Such conditions may be present during deceleration fuel cut-off for cylinder number one. The fuel rail pressure is at a high level and it is constant.

At time t1, the fuel injector statistics determining procedure is activated, and shortly thereafter, fuel is commanded to be and is injected into cylinder number one via a sole fuel injector. The fuel pump is not activated after time t1 so it does not replenish fuel from the fuel rail that is injected into cylinder number one. Consequently, injecting fuel into cylinder number one after time t1 reduces fuel pressure in the fuel rail. The commanded amount of fuel to be injected into cylinder number one after time t1 is constant, but the actual amount of fuel that is injected into cylinder number one as determined from the drop in fuel rail pressure is shown varying. The statistical attributes of the fuel injection amounts between time t1 and time t2 are within a desired range (e.g., less than a threshold standard deviation or coefficient of variation) so the fuel injector being evaluated may be allowed to inject the amount of fuel injected in the individual fuel injections between time t1 and time t2 during nominal operating conditions when fuel injector statistical diagnostics are not being performed. A plurality of fuel injections are commanded and performed after time t1 and the last injection where a first amount of fuel is injected to cylinder number one occurs at time t2. The fuel pressure in the fuel rail drops after each fuel injection between time t1 and time t2. During the time between time t1 and time t2, no other fuel injections are made to other cylinders using fuel from the fuel rail that is supplying fuel to the fuel injector that is being diagnosed in FIG. 5. As such, all of the fuel rail pressure drops shown in FIG. 5 are due to fuel being injected into cylinder number one. Statistical analysis is performed on all the actual fuel amounts that were determined via the fuel injections between time t1 and time t2. For example, if it is determined that the amounts of fuel injected between time t1 and time t2 are 1.1 mg, 1.05 mg, 1.0 mg, 1.08 mg, 1.2 mg, and 1.0 mg, then the standard deviation of the amount of fuel injection may be determined as 0.0748. Of course, the variance, coefficient of variation, and range may also be determined for the same data. During the break in time after time t2, fuel pressure in the fuel rail is replenished via a fuel pump (not shown) while fuel injection to cylinder number one is ceased.

At time t3, the amount of fuel commanded to be injected via the fuel injector with statistical properties that are being evaluated (the sole fuel injector) is increased, and shortly thereafter, fuel is injected into cylinder number one via the sole fuel injector. The fuel pump is not activated after time t3 so it does not replenish fuel from the fuel rail that is injected into cylinder number one. Therefore, when fuel is injected into cylinder number one after time t3, fuel pressure is reduced in the fuel rail. The commanded amount of fuel to be injected into cylinder number one for each fuel injection after time t3 and before time t5 is constant and it is greater than the amount of fuel that is injected each time between time t1 and time t2, but the actual amount of fuel that is injected into cylinder number one as determined from the drop in fuel rail pressure is shown varying. The statistical attributes of the fuel injection amounts between time t3 and time t4 are within a desired range (e.g., less than a threshold standard deviation or coefficient of variation) so the fuel injector being evaluated may be allowed to inject the amount of fuel injected in the individual fuel injections between time t3 and time t4 during nominal operating conditions when fuel injector statistical diagnostics are not being performed. A plurality of fuel injections are commanded and performed after time t3 and the last injection where a second amount of fuel is injected to cylinder number one occurs at time t4. The fuel pressure in the fuel rail dropped after each fuel injection between time t3 and time t4. During the time between time t3 and time t4, no other fuel injections are made to other cylinders using fuel from the fuel rail that is supplying fuel to the fuel injector that is being diagnosed in FIG. 5. As such, all of the fuel rail pressure drops shown in FIG. 5 are due to fuel being injected into cylinder number one. Statistical analysis is performed on all the actual fuel amounts that were determined via the fuel injections between time t3 and time t4. During the break in time after time t4, fuel pressure in the fuel rail is replenished via a fuel pump (not shown) while fuel injection to cylinder number one is ceased.

At time t5, the amount of fuel commanded to be injected via the fuel injector with statistical properties that are being evaluated (the sole fuel injector) is increased a second time, and shortly thereafter, fuel is injected into cylinder number one via the sole fuel injector. The fuel pump is not activated after time t5 so it does not replenish fuel from the fuel rail that is injected into cylinder number one. Therefore, when fuel is injected into cylinder number one after time t5, fuel pressure is reduced in the fuel rail. The commanded amount of fuel to be injected into cylinder number one for each fuel injection after time t5 and before time t7 is constant and it is greater than the amount of fuel that is injected each time between time t3 and time t4, but the actual amount of fuel that is injected into cylinder number one as determined from the drop in fuel rail pressure is shown varying. The statistical attributes of the fuel injection amounts between time t5 and time t6 are not within a desired range (e.g., less than a threshold standard deviation or coefficient of variation) so the fuel injector being evaluated may be not be allowed to inject the amount of fuel injected in the individual fuel injections between time t5 and time t6 during nominal operating conditions when fuel injector statistical diagnostics are not being performed. A plurality of fuel injections are commanded and performed after time t5 and the last injection where a third amount of fuel is injected to cylinder number one occurs at time t6. The fuel pressure in the fuel rail dropped after each fuel injection between time t5 and time t6. During the time between time t5 and time t6, no other fuel injections are made to other cylinders using fuel from the fuel rail that is supplying fuel to the fuel injector that is being diagnosed in FIG. 5. As such, all of the fuel rail pressure drops shown in FIG. 5 are due to fuel being injected into cylinder number one. Statistical analysis is performed on all the actual fuel amounts that were determined via the fuel injections between time t5 and time t6. During the break in time after time t6, fuel pressure in the fuel rail is replenished via a fuel pump (not shown) while fuel injection to cylinder number one is ceased.

At time t7, the amount of fuel commanded to be injected via the fuel injector with statistical properties that are being evaluated (the sole fuel injector) is increased a third time, and shortly thereafter, fuel is injected into cylinder number one via the sole fuel injector. The fuel pump is not activated after time t7 so it does not replenish fuel from the fuel rail that is injected into cylinder number one. Therefore, when fuel is injected into cylinder number one after time t7, fuel pressure is reduced in the fuel rail. The commanded amount of fuel to be injected into cylinder number one for each fuel injection after time t7 and before time t9 is constant and it is greater than the amount of fuel that is injected each time between time t5 and time t6, but the actual amount of fuel that is injected into cylinder number one as determined from the drop in fuel rail pressure is shown varying. The statistical attributes of the fuel injection amounts between time t7 and time t8 are not within a desired range (e.g., less than a threshold standard deviation or coefficient of variation) so the fuel injector being evaluated may be not be allowed to inject the amount of fuel injected in the individual fuel injections between time t7 and time t8 during nominal operating conditions when fuel injector statistical diagnostics are not being performed. A plurality of fuel injections are commanded and performed after time t7 and the last injection where a fourth amount of fuel is injected to cylinder number one occurs at time t8. The fuel pressure in the fuel rail dropped after each fuel injection between time t7 and time t8. During the time between time t7 and time t8, no other fuel injections are made to other cylinders using fuel from the fuel rail that is supplying fuel to the fuel injector that is being diagnosed in FIG. 5. As such, all of the fuel rail pressure drops shown in FIG. 5 are due to fuel being injected into cylinder number one. Statistical analysis is performed on all the actual fuel amounts that were determined via the fuel injections between time t7 and time t8. During the break in time after time t8, fuel pressure in the fuel rail is replenished via a fuel pump (not shown) while fuel injection to cylinder number one is ceased.

At time t9, the amount of fuel commanded to be injected via the fuel injector with statistical properties that are being evaluated (the sole fuel injector) is increased a fourth time, and shortly thereafter, fuel is injected into cylinder number one via the sole fuel injector. The fuel pump is not activated after time t9 so it does not replenish fuel from the fuel rail that is injected into cylinder number one. Therefore, when fuel is injected into cylinder number one after time t9, fuel pressure is reduced in the fuel rail. The commanded amount of fuel to be injected into cylinder number one for each fuel injection after time t9 and before time t11 is constant and it is greater than the amount of fuel that is injected each time between time t7 and time t8, but the actual amount of fuel that is injected into cylinder number one as determined from the drop in fuel rail pressure is shown varying. The statistical attributes of the fuel injection amounts between time t9 and time t10 are within a desired range (e.g., less than a threshold standard deviation or coefficient of variation) so the fuel injector being evaluated may be allowed to inject the amount of fuel injected in the individual fuel injections between time t9 and time t10 during nominal operating conditions when fuel injector statistical diagnostics are not being performed. A plurality of fuel injections are commanded and performed after time t9 and the last injection where a fifth amount of fuel is injected to cylinder number one occurs at time t10. The fuel pressure in the fuel rail dropped after each fuel injection between time t9 and time t10. During the time between time t9 and time t10, no other fuel injections are made to other cylinders using fuel from the fuel rail that is supplying fuel to the fuel injector that is being diagnosed in FIG. 5. As such, all of the fuel rail pressure drops shown in FIG. 5 are due to fuel being injected into cylinder number one. Statistical analysis is performed on all the actual fuel amounts that were determined via the fuel injections between time t9 and time t10. During the break in time after time t10, fuel pressure in the fuel rail is replenished via a fuel pump (not shown) while fuel injection to cylinder number one is ceased.

At time t11, the amount of fuel commanded to be injected via the fuel injector with statistical properties that are being evaluated (the sole fuel injector) is increased a fifth time, and shortly thereafter, fuel is injected into cylinder number one via the sole fuel injector. The fuel pump is not activated after time t9 so it does not replenish fuel from the fuel rail that is injected into cylinder number one. Therefore, when fuel is injected into cylinder number one after time t9, fuel pressure is reduced in the fuel rail. The commanded amount of fuel to be injected into cylinder number one for each fuel injection after time t11 and before time t13 is constant and it is greater than the amount of fuel that is injected each time between time t9 and time t10, but the actual amount of fuel that is injected into cylinder number one as determined from the drop in fuel rail pressure is shown varying. The statistical attributes of the fuel injection amounts between time t11 and time t12 are within a desired range (e.g., less than a threshold standard deviation or coefficient of variation) so the fuel injector being evaluated may be allowed to inject the amount of fuel injected in the individual fuel injections between time t11 and time t12 during nominal operating conditions when fuel injector statistical diagnostics are not being performed. A plurality of fuel injections are commanded and performed after time t11 and the last injection where a sixth amount of fuel is injected to cylinder number one occurs at time t12. The fuel pressure in the fuel rail dropped after each fuel injection between time t11 and time t12. During the time between time t9 and time t10, no other fuel injections are made to other cylinders using fuel from the fuel rail that is supplying fuel to the fuel injector that is being diagnosed in FIG. 5. As such, all of the fuel rail pressure drops shown in FIG. 5 are due to fuel being injected into cylinder number one. Statistical analysis is performed on all the actual fuel amounts that were determined via the fuel injections between time t11 and time t12. During the break in time after time t10, fuel pressure in the fuel rail is replenished via a fuel pump (not shown) while fuel injection to cylinder number one is ceased.

In this way, a fuel injector's statistical fuel injection amount attributes (e.g., standard deviation, variance, range, coefficient of variation, etc.) may be determined for a sole fuel injector without being influenced via other fuel injectors. The statistical fuel injection amount attributes may be determined for a range of fuel injection amounts so that if the fuel injection amounts at one or two fuel injection amounts have undesirable statistical values, then the fuel injector may not be operated to provide the same fuel injection amounts when the engine is operating under nominal conditions where fuel injector statistical attributes are not being determined.

The illustration of FIG. 5 shows the case where all the fuel amounts is the same. This is the simplest case because the statistics may be performed simply on the actual fuel amount. If different fuel amounts are injected, a statistic that is the difference (or ratio) of the commanded and actual fuel injected may be determined. One of the reason one might inject different amounts is to hold the pulse width constant with varying (declining) pressure.

Figure 6A:
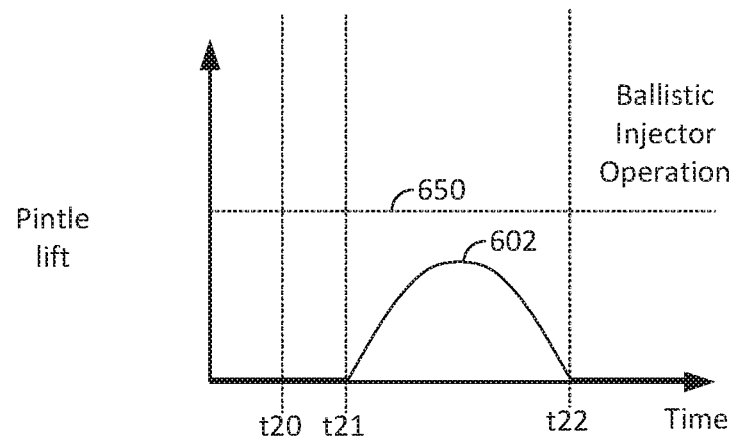
FIGS. 6A and 6B show fuel injector pintle trajectories for ballistic and full lift fuel injector operating modes.

Referring now to FIG. 6A, a plot of fuel injector pintle position versus time is shown. The plot shows pintle (e.g., the fuel flow needle) position of the fuel injector when the fuel injector is operated in a ballistic mode. Ballistic mode is a mode where the fuel injector is activated, but the pintle does not reach its maximum lift state. The pintle does not reach its maximum or full lift state because the fuel injector is energized for only a short amount of time.

The vertical axis represents fuel injector pintle position and the fuel injector pintle position moves to a more open position in the direction of the vertical axis arrow. The fuel injector pintle is fully closed when the pintle position is near the horizontal axis. The horizontal axis represents time and time increases from the left side of the plot to the right side of the plot. Trace 602 represents the pintle position and line 650 represents the maximum or full pintle lift position. The pintle is at its full lift position when the pintle is lifted off of a fuel injector nozzle seat or valve opening and when it is at its end of travel position (e.g., positioned against a stop within the fuel injector).

At time t20 the fuel injector is supplied with electrical power to energize and shortly after the electrical power is withdrawn from the fuel injector. The pintle does not begin to move until time t21, thereafter it begins to lift off of a seat to open and it progresses open, but because the electrical power has been withdrawn from the fuel injector, the pintle does not reach its full or maximum lift position. The pintle closes at time t22. The amount of fuel that flows through the fuel injector during ballistic mode depends how much electric energy is input into the fuel injector and the time duration that the electric energy is input to the fuel injector. Pintle trajectories with lower lift trajectories and a shorter opening duration may be provided by supplying the fuel injector with smaller amounts of electrical energy. Pintle trajectories with higher lift trajectories and a longer opening duration may be provided by supplying the fuel injector with larger amounts of electrical energy.

Figure 6B:
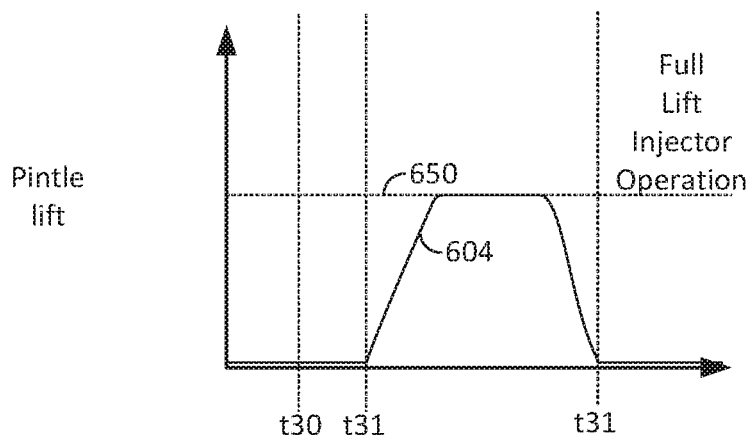

Referring now to FIG. 6B, a plot of fuel injector pintle position versus time is shown. The plot shows pintle position of the fuel injector when the fuel injector is operated in a full lift mode. Full lift mode is a mode where the fuel injector is activated and its pintle reaches its maximum lift state. The pintle reaches its maximum or full lift state because the fuel injector is energized for a longer amount of time.

The vertical axis represents fuel injector pintle position and the fuel injector pintle position moves to a more open position in the direction of the vertical axis arrow. The fuel injector pintle is fully closed when the pintle position is near the horizontal axis. The horizontal axis represents time and time increases from the left side of the plot to the right side of the plot. Trace 604 represents the pintle position and line 650 represents the maximum or full pintle lift position.

At time t30 the fuel injector is supplied with electrical power to energize, and the electrical power is held on the fuel injector so that the pintle reaches its fully open position. The pintle does not begin to move until time t31, but it reaches its full open position where it remains for a time before it fully closes at time t32. The fuel injector may reach its fully open position by supplying electrical power to the fuel injector for a threshold amount of time. Because the pintle reaches its full open position, the amount of fuel delivered by the fuel injector may be precisely controlled.

Referring now to FIG. 7A, a plot of a relationship between fuel injector pulse width and amount of fuel injected by a first fuel injector is shown. The vertical axis represents the amount of fuel injected by the fuel injector and the amount of fuel injected by the fuel injector increased in the direction of the vertical axis arrow. The amount of fuel injected by the fuel injector is zero at the horizontal axis level. The horizontal axis represents the duration of the fuel injector pulse width in units of time and the duration of the pulse width (e.g., electrical signal pulse width) increases from the left side of the figure to the right side of the figure. Trace 702 represents the relationship between the fuel injector pulse width and the amount of fuel injected. Trace 702 does not show the variability in the amount of fuel that may be injected by the fuel injector. The first fuel injectors operation is broken into three ranges tx by ia1, ty by ia2, and tz by ia3.

The first range tx by ia1 defines ballistic operating mode for the first fuel injector. The range is defined by the amount of fuel injected being in a smaller amount range (ia1) and the fuel injector pulse widths (tx) being in a smaller range. As previously mentioned, the fuel injector's pintle does not reach a full lift state in the ballistic mode. Ballistic mode may also be defined by the fuel injector injecting amounts of fuel for a given fuel injector pulse width that have a threshold amount of repeatability that is demonstrated by the statistical attributes of the amounts of fuel injected when the fuel injector is operated in the ballistic mode. For example, for a given fuel injector pulse width in the ballistic operating region, the amount of fuel injected has less than a desired or requested threshold of standard deviation, coefficient of variance, range, or variation. The range of the ballistic mode may be determined via commanding small amounts of fuel to be injected, determining the amounts of fuel injected for each fuel injection, and determining the statistical attributes of the amounts of fuel injected. If the standard deviation of the amount of fuel injected to the cylinder for a defined fuel pulse width is less than a threshold, then it may be determined that the fuel injector is operating in the ballistic mode.

The amounts of fuel injected may be increased to find the beginning of the transition zone (ty by ia2). If the standard deviation of the amount of fuel injected to the cylinder for a defined fuel pulse width is greater than a threshold, then it may be determined that the fuel injector is not operating in the ballistic mode and that the fuel injector is operating in the transition mode. In this example, the amounts of fuel injected that are in the ia1 range for fuel pulse widths in the tx range.

There is nothing inherently bad about operating in any of the three zones except for the variability of injection. Thus, by measuring the variability, you know where not to use a particular fuel injector. If the requested fuel amount is held constant, then the pulse width may be swept as the fuel rail pressure drops. If the fuel injection amount statistic shows variability, it means that the steady state transfer function may have a non-linearity in it and it may be an operating region to avoid.

The second range ty by ia2 defines the transition mode for the first fuel injector. The range is defined by the amount of fuel injected being in a medium amount range and the fuel injector pulse widths being in a medium range. The fuel injector's pintle is difficult to control in the transitional mode and the amount of fuel injected has more than a desired or requested threshold of standard deviation, coefficient of variance, range, or variation. The fuel injector pulse widths for the transition mode (e.g., ty) and their corresponding amounts of fuel injection range (e.g., ia2) and may be defined as a region where the standard deviation of the amount of fuel injected is greater than a threshold standard deviation. The amounts of fuel injected may be increased to find the beginning of the full lift range (tz by ia3). If the standard deviation of the amount of fuel injected to the cylinder for a defined fuel pulse width is less than a threshold, then it may be determined that the fuel injector is operating in the full lift mode and that the fuel injector is no longer operating in the transition mode. In this example, the amounts of fuel injected that are in the ia2 range for fuel pulse widths in the ty range for transition mode.

The third range tz by ia3 defines the full lift mode for the first fuel injector. The range is defined by the amount of fuel injected being in a larger amount range and the fuel injector pulse widths being in a larger range. The fuel injector may supply a precise amount of fuel when it is operated in the full lift mode. Control of the fuel injector's pintle may be more precise in this mode and the amount of fuel injected may have less than a desired or requested threshold of standard deviation, coefficient of variance, range, or variation. The fuel injector pulse widths for the full lift mode (e.g., tz range) and their corresponding amounts of fuel injection range (e.g., ia3) and may be defined as a region where the standard deviation of the amount of fuel injected is less than a threshold standard deviation. In this example, the amounts of fuel injected that are in the ia3 range for fuel pulse widths in the tz range for full lift mode.

Referring now to FIG. 7B, a plot of a relationship between fuel injector pulse width and amount of fuel injected by a second fuel injector is shown. The vertical axis and the horizontal axis of FIG. 7B are the same as the vertical axis and the horizontal axis of FIG. 7A. Therefore, for the sake of brevity their description will not be repeated. Trace 750 represents the relationship between the fuel injector pulse width and the amount of fuel injected. Trace 750 does not show the variability in the amount of fuel that may be injected by the fuel injector. The second fuel injectors operation is broken into three ranges tx1 by ia4, ty1 by ia5, and tz1 by ia6.

The first range txa by ia4, the second range ty1 by ia5, and the third range tz1 by ia6 may be determined as discussed in the description of FIG. 7A. Further, the first range is a ballistic range, the second range is a transition range, and the third range is a full lift range. However, the bounds of the first, second, and third ranges show in FIG. 7B are different than those shown in FIG. 7A. The differences in the ranges may be attributable to part variance and small variations in assembly. The ballistic range of the second fuel injector is slightly smaller than the ballistic range of the first injector. Further, the transition range of the second fuel injector begins at a smaller fuel injector pulse width and a smaller fuel injection amount than the fuel injector pulse width and the fuel injection amount of the first fuel injector. The transition range of the second fuel injector ends at a smaller fuel injector pulse width and a smaller fuel injection amount than the fuel injector pulse width and the fuel injection amount of the first fuel injector. The full lift range of the second fuel injector begins at a smaller fuel injector pulse width and a smaller fuel injection amount than the fuel injector pulse width and the fuel injection amount of the first fuel injector.

It may by observed that the first fuel injector may be operated at larger pulse widths to produce larger fuel injection amounts in its ballistic operating mode than the second fuel injector operated at while in its ballistic mode. Consequently, the first fuel injector may be activated for larger fuel injection amounts in its ballistic operating mode than the second fuel injector. Therefore, if the engine controller requests a fuel amount that is in the ballistic mode range of the first fuel injector, but out of the ballistic operating mode of the second fuel injector, then the first fuel injector may inject the requested fuel amount while the second fuel injector does not inject the fuel. The first and second fuel injectors may be operated according to their unique ballistic, transition, and full lift modes so as to improve injector and engine performance.

Referring now to FIG. 8, a prophetic plot that shows how bimodal fuel injection amounts may be generated via a sole fuel injector. The first plot from the top of FIG. 8 is a plot of a fuel injector command (e.g., a fuel injector voltage pulse width) from an engine controller versus time. The vertical axis represents the state of the fuel injector command, and the fuel injector is commanded to open when trace 802 is at a higher level near the vertical axis arrow level. The fuel injector is commanded to close when trace 802 is at a lower level near the horizontal axis. The horizontal axis represents time and time increases from the left side of the plot to the right side of the plot. Trace 802 represents the fuel injector pulse width. The first and second fuel injects shown in the second and third plots are operated according to the fuel injector command shown in the first plot.

The second plot from the top of FIG. 8 is a plot of a fuel injector pintle position versus time for a loose fuel injector. The vertical axis represents the fuel injector pintle position, and the fuel injector pintle is in a fully open position when trace 804 is at a higher level near the vertical axis arrow level. The fuel injector pintle is fully closed when trace 804 is at a lower level near the horizontal axis. The horizontal axis represents time and time increases from the left side of the plot to the right side of the plot. Trace 804 represents the fuel injector pintle position.

The third plot from the top of FIG. 8 is a plot of a fuel injector pintle position versus time for a sticky (e.g., high friction and/or stiction) fuel injector. The vertical axis represents the fuel injector pintle position, and the fuel injector pintle is in a fully open position when trace 806 is at a higher level near the vertical axis arrow level. The fuel injector pintle is fully closed when trace 806 is at a lower level near the horizontal axis. The horizontal axis represents time and time increases from the left side of the plot to the right side of the plot. Trace 806 represents the fuel injector pintle position.

At time t40, the fuel injector is commanded closed and both the loose and the high stiction fuel injectors are closed. The fuel injectors are commanded open at time t41, but the loose and high stiction fuel injectors remain closed. At time t42, the loose fuel injector begins to open, but the high stiction fuel injector remains closed. The high stiction fuel injector begins to open at time t43 and the loose fuel injector is fully open. Both fuel injectors are commanded closed at time t44 and they both close shortly thereafter.

The amount of time the loose fuel injector is open is longer than the amount of time the high stiction fuel injector is open. Therefore, the loose fuel injector injects a larger mass of fuel than does the high stiction fuel injector. A single fuel injector may exhibit high stiction operation characteristics (e.g., smaller injection amounts) for a few operating cycles when an engine is cold started, then the fuel injector may exhibit characteristics of a looser fuel injector (e.g., larger injection amounts). Thus, the fuel injector may exhibit bimodal fuel amount injection characteristics when it transitions from cold operation to warm operation. This change in fuel injection characteristics may be identified via the method of FIGS. 2-4.

Referring now to FIG. 9, a prophetic histogram of "normal like" distribution of fuel injection amounts for a sole fuel injector is shown. The vertical axis represents the number of a particular fuel injection amount, and the number of injections of the particular fuel injection amount increases in the direction of the vertical axis. The horizontal axis represents amounts of fuel injected and the amount of fuel injected increases from the left side of the plot to the right side of the plot.

The plot shows nine different bins (e.g., 901, 902, and 903) of different fuel injection amounts and the height of the bins is indicative of the actual total number of fuel injections that fall into the amounts of fuel that define the individual bins. For example, bin 902 includes a greater number of fuel amounts than bins 901 and 903. The amount of fuel corresponding to bin 901 (e.g., 1.9 mg) is smaller than the amount of fuel corresponding to bin 902 (e.g., 2 mg.). The amount of fuel corresponding to bin 903 (e.g., 2.1 mg.) is larger than the amount of fuel corresponding to bin 902 (e.g., 2 mg.). The fuel injector delivering fuel for the distribution shown in FIG. 9 was commanded to inject 2 mg. of fuel.

The "near normal" distribution shown in FIG. 9 may be identified by injecting fuel via a fuel injector a plurality of times as described in the methods of FIGS. 2-4 while the fuel injector is commanded to inject a constant amount of fuel. The fuel amounts injected may be determined via fuel rail pressure. The fuel amounts may be assigned to a predetermined number of bins and the actual total number of fuel amounts falling into each bin may be counted. A "normal or normal like" distribution includes a single peak. The single peak may be identified by evaluating the height of each bin relative to bins on either side of the bin being evaluated. For example, bin 901 is below (in terms of amount of fuel injected bins) bin 902, and bin 903 is above (in terms of amount of fuel injected bins) bin 902. Bin 901 holds a fewer number of fuel injections than bin 902 and bin 903 holds a fewer number of fuel injections than bin 902. Therefore, bin 902 is a peak. None of the other bins have bins that are immediately both above and below the other bins with fewer numbers of fuel injections. Therefore, only 902 is a peak bin in the distribution of FIG. 9. As such, the distribution may be characterized as a "near normal" distribution.

Referring now to FIG. 10, a prophetic histogram of "bimodal" distribution of fuel injection amounts for a sole fuel injector is shown. The vertical axis represents the number of a particular fuel injection amount, and the number of injections of the particular fuel injection amount increases in the direction of the vertical axis. The horizontal axis represents amounts of fuel injected and the amount of fuel injected increases from the left side of the plot to the right side of the plot.

The plot shows eleven different bins (e.g., 1002, 1003, and 1004, etc.) of different fuel injection amounts and the height of the bins is indicative of the actual total number of fuel injections that fall into the amounts of fuel that define the individual bins. For example, bin 1002 includes a greater number of fuel amounts than bins 1001 and 1003. The amount of fuel corresponding to bin 1001 (e.g., 0.9 mg) is smaller than the amount of fuel corresponding to bin 1002 (e.g., 1 mg.). The amount of fuel corresponding to bin 1003 (e.g., 1.1 mg.) is larger than the amount of fuel corresponding to bin 1002 (e.g., 1 mg.). The fuel injector delivering fuel for the distribution shown in FIG. 1A was commanded to inject 2 mg. of fuel.

The "bimodal" distribution shown in FIG. 10 may be identified by injecting fuel via a fuel injector a plurality of times as described in the methods of FIGS. 2-4 while the fuel injector is commanded to inject a constant amount of fuel. The fuel amounts injected may be determined via fuel rail pressure. The fuel amounts may be assigned to a predetermined number of bins and the actual total number of fuel amounts falling into each bin may be counted. A "bimodal" distribution includes two separated peaks. The two peaks may be identified by evaluating the height of each bin relative to bins on either side of the bin being evaluated. For example, bin 1001 is below (in terms of amount of fuel injected bins) bin 1002, and bin 1003 is above (in terms of amount of fuel injected bins) bin 1002. Bin 1001 holds a fewer number of fuel injections than bin 1002 and bin 1003 holds a fewer number of fuel injections than bin 1002. Therefore, bin 1002 is a first peak. Likewise, bin 1008 is below (in terms of amount of fuel injected bins) bin 1010, and bin 1011 is above (in terms of amount of fuel injected bins) bin 1010. Bin 1008 holds a fewer number of fuel injections than bin 1010 and bin 1011 holds a fewer number of fuel injections than bin 1010. Therefore, bin 1010 is a second peak. None of the other bins have bins that are immediately both above and below the other bins with fewer numbers of fuel injections. Therefore, only 1002 and 1010 are peak bins in the distribution of FIG. 10. In addition, a "bimodal" may be required to have a predetermined fuel amount between the peak bins as shown by leader fa. If the distribution has two peaks that are closer together than a threshold fuel amount, then the distribution may not be characterized as "normal like" or some other distribution.

In this way, presence or absence of a bimodal distribution may be determined. If a bimodal distribution is found, then the fuel injector may be deactivated in a fuel injection amount range where the bimodal distribution is present so that the engine's air-fuel ratio may be more closely controlled.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
repeatedly commanding a fuel injector a same, fixed, amount to produce corresponding actual fuel injection amounts;
binning the actual fuel injection amounts; and
adjusting operation of the fuel injector during subsequent fuel injection operation to the repeated commanding based on a bimodal fuel injection distribution in the binned actual fuel injection amounts produced via the fuel injector.

2. The method of claim 1, further comprising operating an engine with the fuel injector and a plurality of fuel injectors including a plurality of transitional fuel injection regions.

3. The method of claim 2, further comprising not operating injectors in the plurality of transitional fuel injection regions.

4. The method of claim 1, where adjusting operation of the fuel injector includes avoiding operating the fuel injector in a transition region of the fuel injector.

5. The method of claim 4, where the transition region is related to the bimodal distribution.

6. The method of claim 5, where the bimodal distribution is determined via a plurality of peaks identified in the binned actual fuel injection amounts.

7. A system for operating an engine, comprising:
- an engine including a first fuel injector to inject fuel to an engine cylinder; and
- a controller including executable instructions stored in non-transitory memory to:
  - repeatedly command the fuel injector a same, fixed, amount to produce corresponding actual fuel injection amounts, bin actual the fuel injection amounts; and adjust operation of the fuel injector during subsequent fuel injection operation to the repeated commanding in response to a bimodal fuel injection distribution in the binned actual fuel injection amounts produced via the fuel injector.

8. The system of claim 7, further comprising additional instructions to adjust operation of a second fuel injector in response to the bimodal fuel injection distribution produced via the first fuel injector.

9. The system of claim 8, where adjusting operation of the first fuel injector includes not injecting fuel via the first fuel injector in a region of fuel injection amounts for the cylinder.

10. The system of claim 9, where adjusting operation of the second fuel injector includes injecting fuel via the second fuel injector in the region of fuel injection amounts for the cylinder.

11. The system of claim 8, further comprising additional instructions to adjust operation of the second fuel injector in response to a bimodal fuel injection distribution produced via the second fuel injector.

\* \* \* \* \*